(12) United States Patent
Green

(10) Patent No.: US 6,829,520 B1
(45) Date of Patent: Dec. 7, 2004

(54) TIME-AND-TEMPERATURE SENSITIVE MATERIAL TRACKING

(75) Inventor: Craig B. Green, Maryland Heights, MO (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/454,419

(22) Filed: Jun. 3, 2003

(51) Int. Cl.[7] .............................................. G06F 7/00
(52) U.S. Cl. ...................... 700/225; 700/241; 700/244; 340/825.6; 235/385
(58) Field of Search .................................. 700/224, 225, 700/241, 236, 244, 242; 340/825.69, 825.06, 825.35, 673; 235/381, 383, 385

(56) References Cited

U.S. PATENT DOCUMENTS

| | | | | |
|---|---|---|---|---|
| 5,368,129 A | * | 11/1994 | Von Kohorn | 186/52 |
| 5,671,362 A | * | 9/1997 | Cowe et al. | 705/28 |
| 5,711,160 A | * | 1/1998 | Namisniak et al. | 62/125 |
| 5,802,015 A | * | 9/1998 | Rothschild et al. | 368/10 |
| 5,953,234 A | * | 9/1999 | Singer et al. | 700/214 |
| 6,131,399 A | * | 10/2000 | Hall | 62/127 |
| 6,204,763 B1 | * | 3/2001 | Sone | 340/568.1 |
| 6,294,997 B1 | * | 9/2001 | Paratore et al. | 340/572.1 |
| 6,327,576 B1 | * | 12/2001 | Ogasawara | 705/22 |
| 6,337,836 B1 | * | 1/2002 | Eidelson | 368/10 |
| 6,501,390 B1 | * | 12/2002 | Chainer et al. | 340/870.16 |
| 6,609,078 B2 | * | 8/2003 | Starling et al. | 702/130 |

* cited by examiner

*Primary Examiner*—Khoi H. Tran
(74) *Attorney, Agent, or Firm*—Black Lowe & Graham PLLC

(57) ABSTRACT

A system and method for tracking sensitive materials in a manufacturing system. The system includes a radio frequency identification component and a reporting system. The radio frequency identification component includes frequency identification labels that are attached to container units of sensitive material. Each frequency identification label includes expiration date information about the material within the container unit that the label is attached to. The radio frequency identification component also includes one, or more antenna for reading the information from the radio-frequency identification labels oh each container. The reporting system receives at least a portion of the information reads from the radio-frequency identification labels from the radio frequency identification system and generates at least one report based on the received information.

20 Claims, 6 Drawing Sheets

US 6,829,520 B1

TIME-AND-TEMPERATURE SENSITIVE MATERIAL TRACKING

FIELD OF THE INVENTION

This invention relates generally to manufacturing management and, more specifically, to material tracking during manufacturing.

BACKGROUND OF THE INVENTION

Production operations for the manufacturing of a product may use various sensitive materials having expiration dates, such as sealants, adhesives and paints. Current practice is to label the container of the sensitive material with the expiration date and place containers in freezers or flammable cabinets in production areas. To ensure expired materials are not used in production, personnel must check the expiration date labels prior to use and must periodically check freezers and cabinets to purge expired materials. To stock and replenish needed materials, personnel physically visit each storage unit and count remaining items to determine needed re-ordering quantities for that material.

The current process does not sufficiently prevent the use of expired material due to misplaced materials, unnoticed expired materials, and lack of discipline in checking storage units. Internal and external audits occasionally reveal expired material in freezers and cabinets. Lack of real time visibility and tracking of material usage results in inefficient use, extra costs, and excess material disposal.

Therefore, there exists an unmet need for a process and system that identifies expired material, prevents expired material use in production and tracks and optimizes purchase, usage, and disposal of sensitive materials.

SUMMARY OF THE INVENTION

The present invention provides a system and method for tracking sensitive materials. The system includes a radio frequency identification component and a reporting system. The radio frequency identification component includes frequency identification labels that are attached to container units of sensitive material. Each frequency identification label includes at least one of information about the material or identification information of the material within the corresponding container unit the label is attached to. The radio frequency identification component also includes one or more antenna for reading the information from the radio-frequency identification labels on each container at a storage unit. The reporting system receives at least a portion of the information read from the radio-frequency identification labels from the radio frequency identification system and generates at least one report based on the received information.

In one aspect of the invention, the frequency identification labels include expiration date information of the sensitive material within the container.

In another aspect of the invention, the reporting system generates an alert if the expiration date information indicates that the associated material is within predefined threshold values.

In still another aspect of the invention, one of the generated reports includes information about the status of sensitive materials in the manufacturing system and sends the generated report with the status of sensitive materials to a materials tracking agency.

In yet another aspect of the invention, the system includes a purchasing component that receives at least a portion of the information read from by the antenna and performs automatic purchasing and tracking of materials based on the received information. The automatic purchasing includes automatically sending a request to a supplier for more material based on the received information.

In still another aspect of the invention, storage units house the container units of sensitive materials. The antenna may be mounted near an opening of the storage unit and may be coupled, to an interior wall of the storage unit, to an interior base of the storage unit, or to a shelf of the storage unit.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

The present invention provides a system and method for providing automatic environmental reporting, automated material tracking and replenishing for sensitive and non-sensitive materials. Many specific details of certain embodiments of the invention are set forth in the following description and in FIGS. 1–9 to provide a thorough understanding of such embodiments. One skilled in the art, however, will understand that the present invention may have additional embodiments, or that the present invention may be practiced without several of the details described in the following description.

Figure 1:
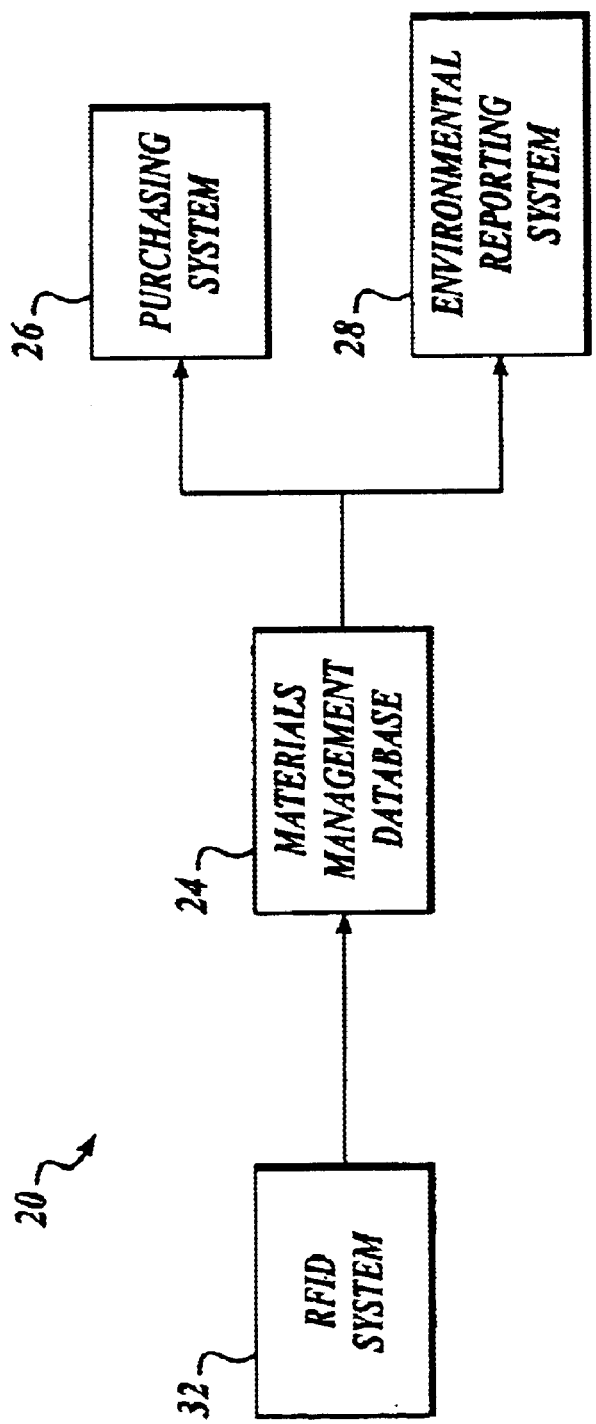
FIG. 1 illustrates a block diagram of a system formed in accordance with the present invention.

As shown FIG. 1, an example system 20 of the present invention includes a materials management database 24, a purchasing system 26, and an environmental reporting system 28. The materials management database 24 is coupled to a radio frequency identification (RFID) system 32. The purchasing system 26 and the environ mental reporting system 28 are coupled to the materials management database 24. The RFID system 32 provides information about materials used in a process, such as manufacturing or production, to the materials management database 24, the purchasing system 26, and the environmental reporting system 28.

The materials management database 24 keeps track of each container of material held by a storage unit. The materials management database 24 tracks whether an item is present in the storage unit or has been removed from the storage unit. The materials management database 24 may contain a threshold value for re-ordering more material and send that order to the purchasing system 26. The materials management database 24 also tracks cumulative number of items (i.e., amount) of materials having been stored in each storage unit by date/time and sends that information to the environmental reporting system to enable reporting material usage for prescribed time periods.

Generally, the RFID system 32 includes three main components; a tag or transponder, an antenna, and a reader. The reader is connected to a host controller (e.g., PC or server). There are two types of tags: passive and active. Passive tags get their energy from the antenna. Active tags have a battery or other powering device. As a tag passes or is located in the field of the antenna, the tag is queried (activated for passive) and the information on the tag is transmitted through the antenna to the reader. The reader passes this information (id number or additional information) to the host controller to filter and monitor the tag information. The host controller is then generally connected to a database to store and track tag reads at various antenna locations and over periods of time. The database is constantly updated as tags enter and exit antenna fields. The information from this database can be used in other electronic systems to conduct transactions (ordering, stocking, reporting, etc.). Examples of a suitable RFID system that may be used in the present invention includes one of the type disclosed in U.S. Pat. No. 4,751, 516.

The present invention includes two alternate methods for recording the pertinent information about time-and-temperature sensitive material using radio-frequency identification. One technique is to use RFID tags with sufficient memory storage to encode the information (material type, vendor name, batch number, manufacturing date, etc.) on a microchip of the tag. The second method is to use RFID tags that only contain a unique ID number encoded in the microchip and then to utilize a separate database that stores an association between a unique ID number and an item's attributes. In the first method, the microchip is queried by the antenna and the encoded information is read. In the second method, the microchip is queried by the antenna and the encoded ID number is read. The system then consults a database to ascertain what the item is via the ID number association noted above.

The present invention includes two alternate methods for identifying the presence of RFID tags. One method is to monitor "state", the other is to monitor "events." The state method is set-up such that the antenna is placed in a location to monitor what RFID tags are present in its field. In one embodiment the antennas are placed in the freezer or storage unit. As items are removed from a storage unit, the antenna will note the missing tag and the system records the item as having left the storage unit. Subsequently, when an item is placed in the storage unit and its tag is read, the antenna records the item as having been placed (or placed back) into the storage unit.

The events method is set-up such that the antenna is placed in a location to monitor RFID tags as they move across its field, hence, monitor the event of a tag moving in or out. In another embodiment, the antennas are placed at the opening of the storage unit (i.e., portal placement). As items cross the field of the antenna as the items are placed in or removed from the storage unit, the antenna notes the presence of the tag through the portal and the system records the item as having been placed in or removed from the storage unit.

The purchasing system 26 may use the information provided by the materials management database 24 to alert a buyer to a need for a particular material, or even to automatically request more materials from suppliers. For example, the materials management database 24 provides information that shows that the amount of a solvent used in a process is low or a number of batches of the solvent are about to expire. The purchasing system 26 sends a request to a supplier to send more solvent based on the provided information.

The environmental reporting system 28 may receive information from the materials management database 24 and may automatically generate reports of used, recycled or safely disposed of quantities of sensitive materials based on information provided by the materials management database 24. Alternately, such reports may be provided upon request. The information provided by the materials management database 24 includes storage location or time information of batches of various sensitive materials, or expiration dates of each batch of sensitive materials. The generated reports may be sent to an agency that tracks sensitive materials, such as the Environmental Protection Agency.

Figure 2:
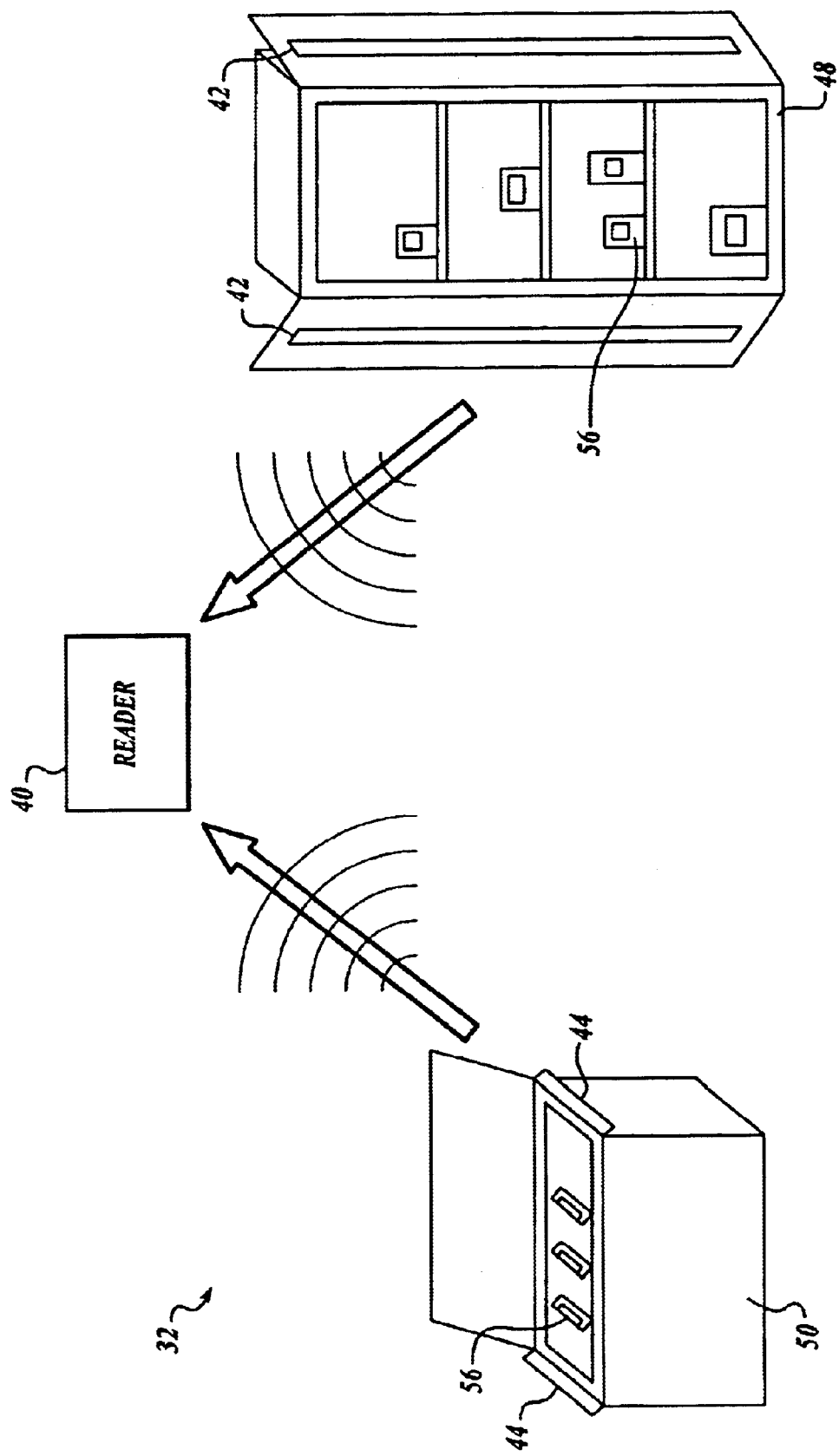
FIG. 2 illustrates a component of a system shown in FIG. 1.

FIG. 2 illustrates exemplary components of the RFID system 32. The RFID system 32 includes a reader 40 that receives wireless signals from wireless antennas 42 and 44 that are located at sensitive material storage units, such as, without limitation, a cabinet 48 and a freezer 50. The antennas 42 and 44 receive information from RFID tags 56 that are located on containers that include sensitive materials that are stored within the respective storage units. The read information is sent to a computer (PC, handheld, etc.) (not shown). In accordance with an embodiment of the present invention, the RFID tags 56 may include information such as, without limitation, a material code (internal identification number), a MIDVAR number (international identification number), a batch or lot number, a mixed date, an expiration date, and a storage unit or associated department or area that is using the sensitive material that is labeled. The reader 40 sends the information received from the RFID tags 56 to the materials management database 24, the purchasing system 26, and the environmental reporting system 28.

Figure 4:
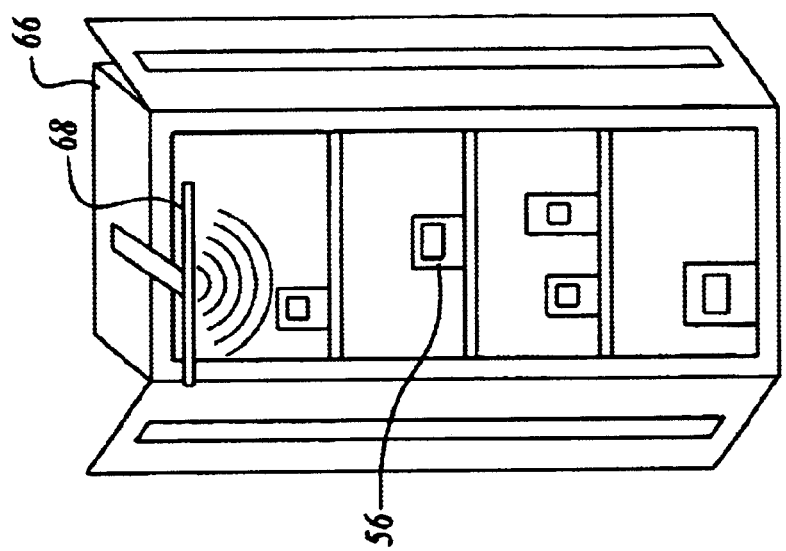
FIGS. 3–8 illustrate various radio-frequency identification configurations.
Figure 3:
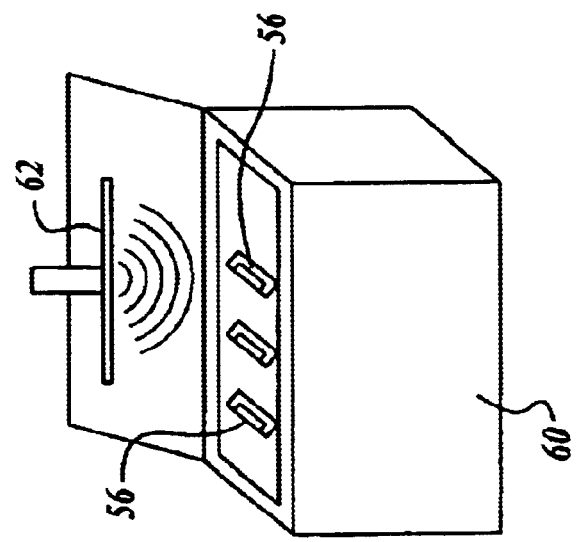

FIGS. 3 and 4 illustrate storage units 60 and 66 that include respective antennas 62 and 68 that are located outside the units 60 and 66 near the openings of the respective units 60 and 66. The antennas 62 and 68 are suitably positioned to read the RFID tags 56 on material containers or packages within the respective storage unites 60 and 66. The antennas 62 and 68 can also be configured to read RFID tags 56 on containers as the containers are being placed in or removed from the storage units 60 and 66.

Figure 6:
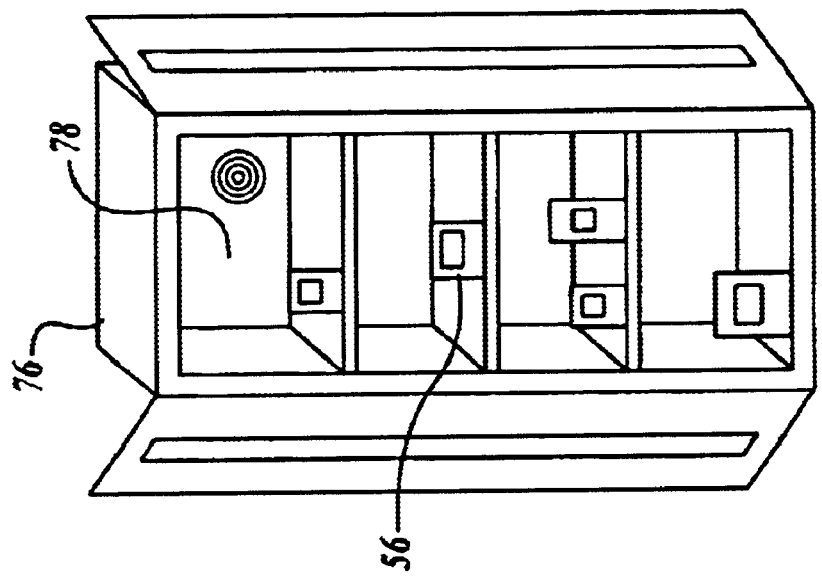
Figure 5:
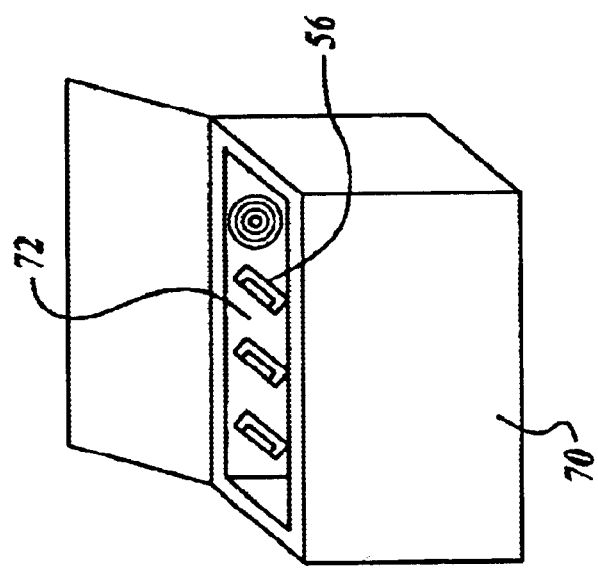

FIGS. 5 and 6 illustrate storage units 70 and 76 that include antennas 72 and 78 that are positioned along an interior wall of the storage units 70 and 76. The antennas 72 and 78 wirelessly read the RFID tags 56 of the material containers stored within the respective storage units 70 and 76 and transmit the relevant information to one or more of the materials management database 24, the purchasing system 26, and the environmental reporting system 28 as described above.

Figure 8:
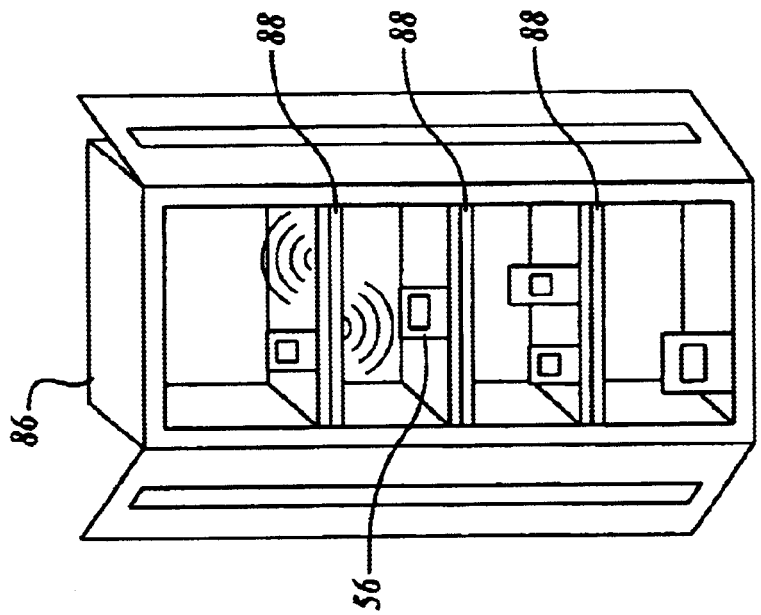
Figure 7:
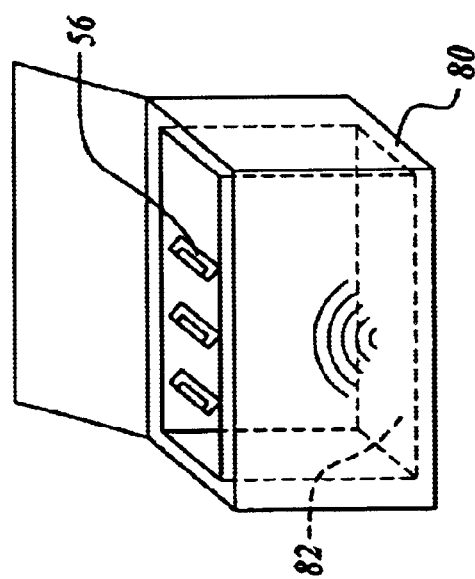

FIGS. 7 and 8 illustrate storage units 80 and 86 that include antennas 82 and 88 that are positioned horizontally within the storage units 80 and 86. With respect to FIG. 7, the antenna 82 is placed at the base of the interior of the storage unit 80. As shown in FIG. 8, a plurality of antennas 88 are placed on or below shelves within the storage unit 86. The antennas 82 and 88 perform the same functions as the previously described antennas.

Figure 9:
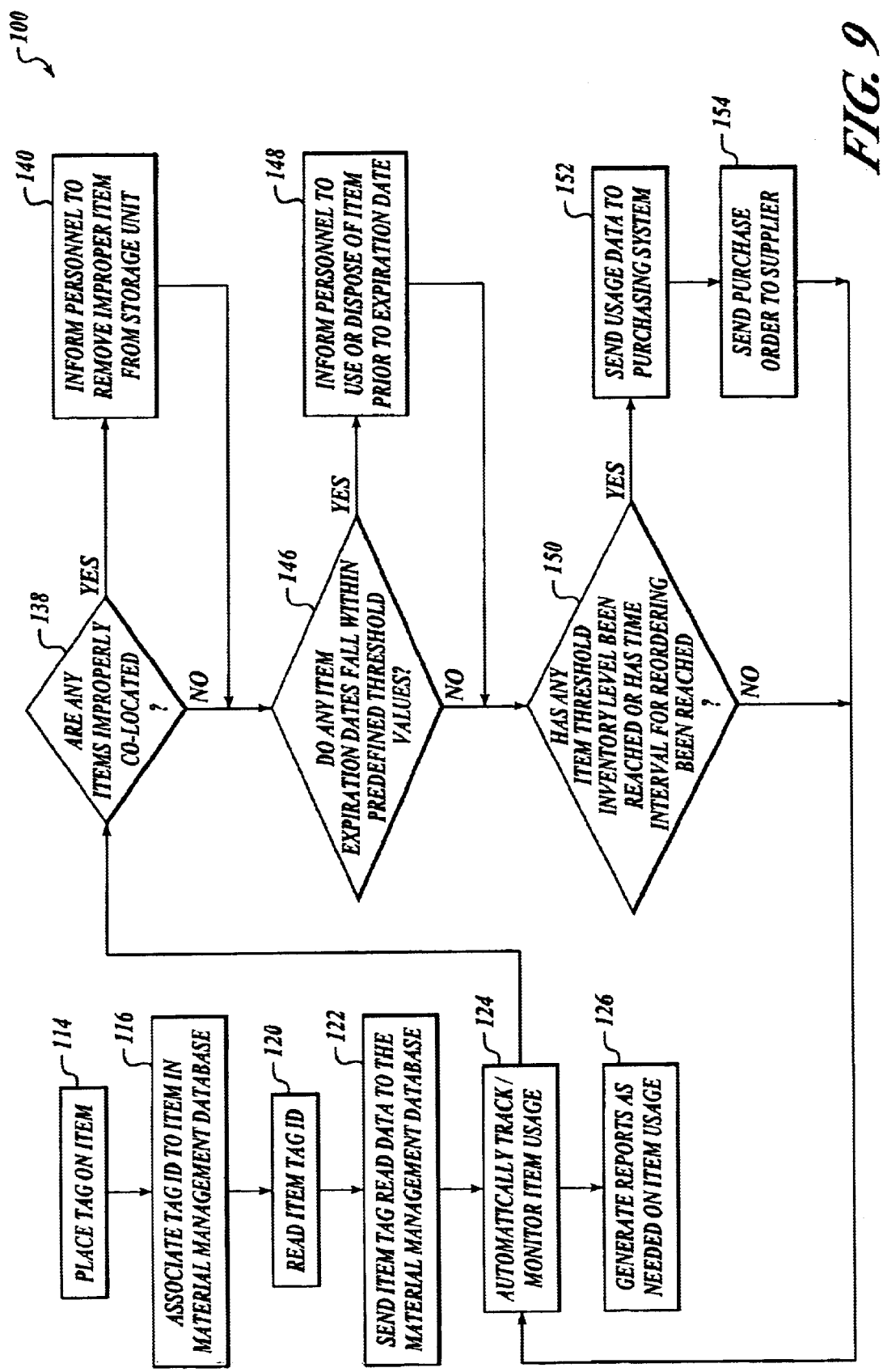
FIG. 9 illustrates a floor diagram of the present invention.

FIG. 9 illustrates a non-limiting example process 100 performed by the system 20 shown in FIG. 1. First, at block 114, a tag (RFID label) is placed on an item. At block 116 the details of an item are associated with the placed tag within the materials management database 24. At block 120, the RFID system 32 reads the RFID label of an item that was placed into or removed from the storage unit, or periodically reads the RFID labels of all the items within the storage unit. Next, at block 122, the information that is read off the RFID labels is sent to the materials management database 24. At block 124, the materials management database 24 automatically tracks and/or monitors item usage. At block 126, reports are generated as needed regarding item usage.

At decision block 138, the materials management database 24 determines if any items are improperly located. In other words, some materials should not be placed in the same storage unit as other materials due to safety concerns (e.g., risk of explosive or flammable hazards). If yes, then, at block 140 the materials management database 24, such as a computer-based system, informs personnel to remove improper items from the storage unit. If no, then, at decision block 146, the materials management database 24 determines if any item expiration dates fall within predefined threshold values. If they do, then, at block 148, the materials management database 24 informs personnel to use or dispose of item before the expiration date. If the decision at block 142 indicates that the expiration date does not fall within the threshold values, then at decision block 150, the materials management database 24 determines if any item threshold inventory level has been reached or has a time interval for re-ordering been reached. If yes, then, at block 152, the materials management database 24 sends usage data to the purchasing system 26 that, at block 154, sends a purchase order to a supplier. If no, then, the process 100 returns to block 124.

In an alternate embodiment of the present invention, some materials are kept in refrigerated storage units to extend their shelf life (e.g., sealants, adhesives, composite pre-preg material). Some items must be tracked based on the amount of time they are out of the freezer environment. Thus, as items are removed from refrigerated storage and placed back in storage, the time they are out of the freezer is recorded and cumulatively tracked until the material reaches a maximum "out-time" or otherwise expires based on time since the manufacturing date. This recording and tracking has traditionally been done by either hand written log-sheets or by manual entry into an electronic database. This embodiment automatically records when items enter and leave a storage unit as the antennas register the presence of the RFID tag on the item. The record can then be automatically fed to an electronic database and tracked over time. The system can generate an alert when the item reaches some predefined threshold cumulative "out-time" value.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A system for tracking sensitive materials, the system comprising:
   a radio frequency identification system comprising:
      one or more frequency identification labels attached to one or more container units of sensitive material, wherein each frequency identification label includes at least one of information about the material or identification information corresponding to the material within the corresponding container unit; and
      one or more antenna for reading the radio-frequency identification labels on each container; and
   a reporting system for receiving at least a portion of the information read from the one or more radio-frequency identification labels from the radio frequency identification system, for generating at least one report based on the received information,
   wherein one of the generated reports includes information about the status of sensitive materials, and the reporting system sends the generated report with the status of sensitive materials to a materials tracking agency.

2. The system of claim 1, wherein each frequency identification label includes expiration date information of the sensitive material within the container.

3. The system of claim 2, wherein the reporting system generates an alert if the expiration date information indicates that the associated material is within a predefined threshold value.

4. The system of claim 2, wherein the reporting system further generates disposal instructions for expired materials based on the received information and sends the generated disposal instructions to personnel for removing the expired materials.

5. The system of claim 1, further comprising a purchasing system for receiving at least a portion of the information read from by the antenna land performing automatic purchasing and tracking of materials based on the received information.

6. The system of claim 5, wherein the purchasing system automatically sends a request to a supplier for more material based on the received information.

7. The system of claim 1, further comprising a storage unit for housing the container units of sensitive material, wherein the antenna is mounted near an opening of the storage unit.

8. The system of claim 1, further comprising a storage unit for housing the container units of sensitive material, wherein the antenna is mounted to an interior wall of the storage unit.

9. The system of claim 1, further comprising a storage unit for housing the container units of sensitive material, wherein the antenna is mounted to an interior base of the storage unit.

10. The system of claim 1, further comprising a storage unit for housing the container units of sensitive material, wherein the antenna is mounted to a shelf of the storage unit.

11. The system of claim 1, further comprising a storage unit for housing the container units of sensitive material, wherein the reporting system determines at least one of an amount of time the container unit of sensitive material is located within the storage unit or an amount of time the container unit of sensitive material is located outside of the storage unit and generates an alert if the determined amount of time is outside of a predefined threshold value.

12. The system of claim 1, further comprising a storage unit for housing the container units of sensitive material, wherein the reporting system determines if the container unit of sensitive material is stored improperly and generates an alert if the container unit is determined to be improperly stored.

13. A method for tracking sensitive materials, the method comprising:
   attaching a radio-frequency identification label to a container unit of sensitive material, wherein the frequency identification label includes at least one of information about the material or identification information corresponding to the material within the corresponding container unit;
   wirelessly reading the radio-frequency identification label on the container at a storage unit;
   generating at least one report based on the read information, one of the at least one generated reports includes information about the status of sensitive materials; and
   sending the generated report with the status of sensitive materials to a materials tracking agency.

14. The method of claim 13, wherein each radio-frequency identification label includes expiration date information of the sensitive material within the container.

15. The method of claim 14, further comprising generating an alert if the expiration date information indicates that the associated material is within a predefined threshold value.

16. The method of claim 14, further comprising generating a disposal instruction for a material having an expired date based on the received information and sending the generated disposal instruction to personnel for removal of the expired material.

17. The method of claim 13, further comprising performing automatic purchasing and tracking of materials based on the read information.

18. The method of claim 17, wherein performing automatic purchasing includes automatically sending a request to a supplier for more material based on the read information.

19. The method of claim 13, further comprising determining at least one of an amount of time the container unit of sensitive material is located within the storage unit or an amount of time the container unit of sensitive material is located outside of the, storage unit and generates an alert if the determined amount of time is outside of a predefined threshold value.

20. The method of claim 13, further comprising determining if the container unit of sensitive material is stored improperly and generating an alert if the container unit is determined to be improperly stored.

* * * * *